United States Patent Office 3,562,078
Patented Feb. 9, 1971

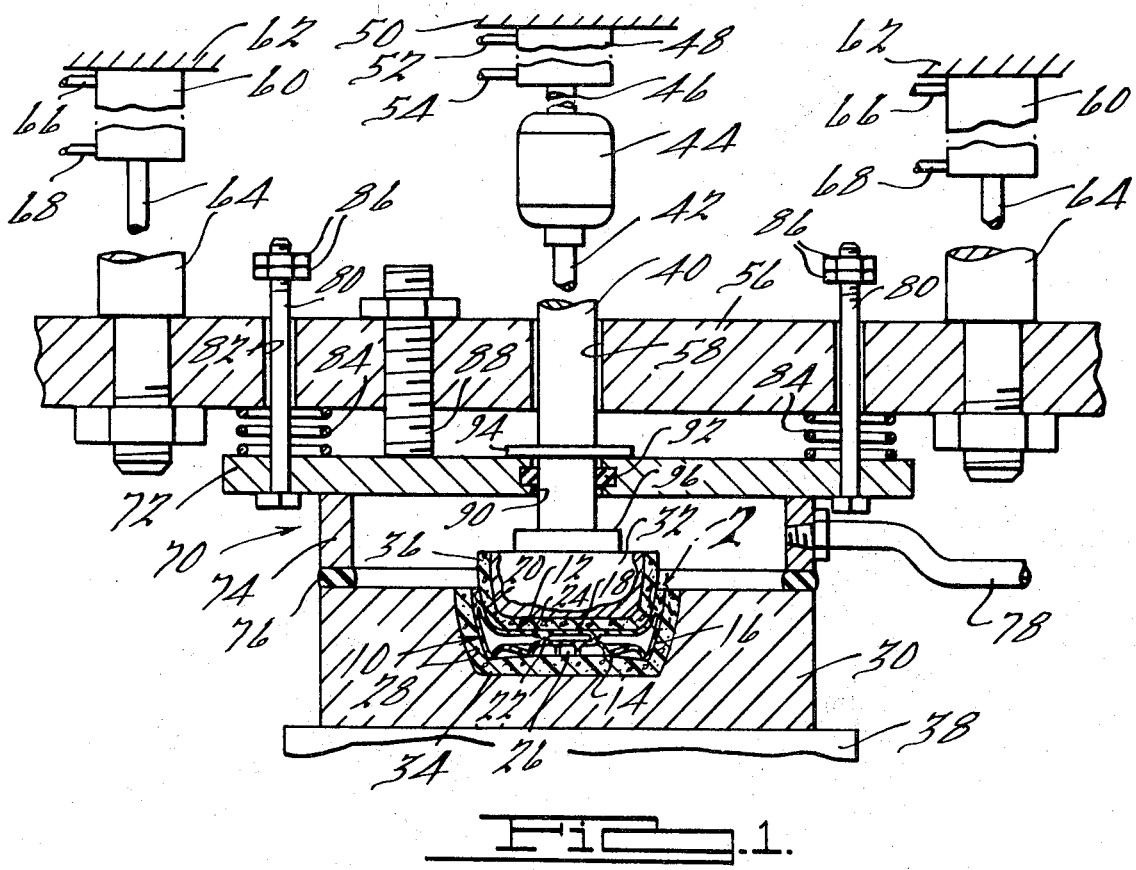
FIG. 1.
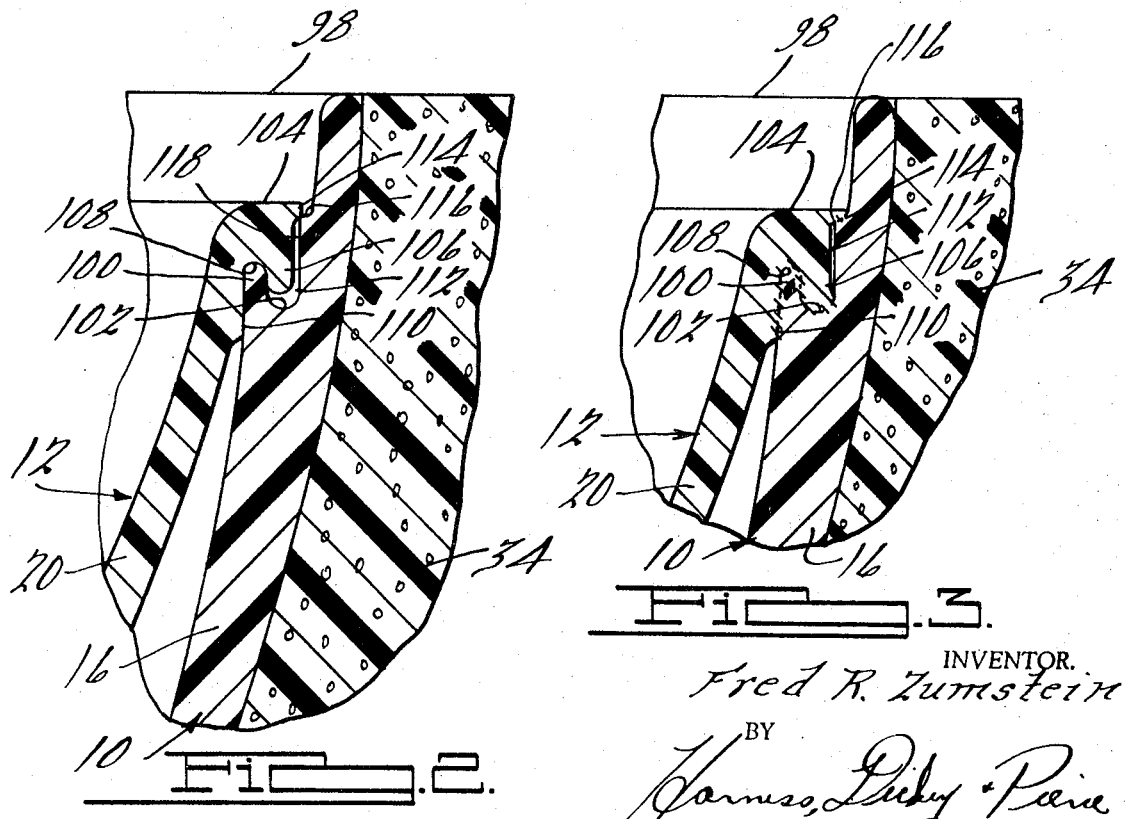
FIG. 2.
FIG. 3.
INVENTOR.
Fred R. Zumstein

---

3,562,078
DOUBLE WALLED PLASTIC ARTICLES AND METHOD OF MAKING SAME
Fred R. Zumstein, Detroit, Mich., assignor to King-Seeley Thermos Co., Ann Arbor, Mich., a corporation of Delaware
Filed Jan. 23, 1969, Ser. No. 793,302
Int. Cl. B23b 1/04; B29 27/08
U.S. Cl. 161—44
11 Claims

ABSTRACT OF THE DISCLOSURE

A double-walled heat insulating plastic article having walls which are fused together by spin welding and wherein the weld joint has provision for collecting and confining flashing which comes from the bearing surfaces of the walls during the spin welding operation.

BACKGROUND OF THE INVENTION

It is conventional in the art to make double walled plastic articles by fusing the two walls together in a spin welding operation. This comprises rotating at least one of the two walls or shells relative to the other under moderate pressure so that friction induced by rotation softens the contacting bearing surfaces of the shells. A very short rotation period (usually, only a matter of a few seconds) is sufficient for this purpose. At the end of the rotating step, the parts fuse together and are permanently bonded and integrally joined together. Frequently, air is exhausted from between the shells prior to and during the spin welding operation to enhance and augment the heat insulating effect of the double wall construction, and also to prevent trapped in pressure during spin welding or the creation of internal pressure and consequential distortion of the articles when subsequently exposed to temperatures in the order of 200° F. as in an automatic dishwasher for example.

Various kinds of spin welders are available, and they are used for making many different kinds of articles including items of tableware such as glasses, cups, serving dishes, plates and plate covers. A typical spin welding apparatus is disclosed in the Decker et al. Pat. No. 3,244,574 which issued Apr. 5, 1966.

The problem arises during spin welding that the contacting bearing surfaces of the two shells soften sufficiently so that some flashing occurs. If this flashing is excessive, it flies up along the inner side of the outer shell and accumulates on exposed surfaces adjacent to the weld as a thin irregular overlay. This flashing must be trimmed away by a machining operation which considerably increases the cost of the finished product.

SUMMARY OF THE INVENTION

The present invention solves the problem of flashing accumulation on exposed surfaces during spin welding. More specifically, the invention contemplates providing the plastic parts which are adapted to be fused together with annular interfitting portions having inner bearing surfaces which mutually engage and are fused together by spin welding. One of the parts is formed to provide an internal cavity adjacent to and outwardly of the contacting bearing surfaces and one of the parts is formed with a projecting lip which overlays and at least partially closes the cavity. Flashing coming off the parts during spin welding accumulates in the cavity and is confined by the overlaying lip. Pressure applied to the parts during the welding operation and a subsequent dwell period presses and holds the bearing surfaces together so that the parts are integrally joined and welded together with the lip closing and essentially sealing any portion of the cavity which remains after the welding operation. Thus, the overlying lip not only retains and confines the flashing from the main weld surfaces but also produces a finished product which is more effectively sealed and better finished than otherwise would be the case that has no significant groove or crack between the shells in which objectionable food and dirt can accumulate.

DESCRIPTION OF THE DRAWING

FIG. 1 is a vertical sectional view showing a plate cover as a typical example of a spin welded article of manufacture associated with a spin welder of the type shown in the Decker et al. patent referred to above, FIG. 2 is an enlarged, fragmentary, sectional view of the portion of FIG. 1 enclosed in the circle 2 and particularly showing the construction and relationship of the two shells at the sealing edges thereof prior to spin welding, and FIG. 3 is a view similar to FIG. 2 but showing the shells after being fused together by spin welding.

DESCRIPTION OF THE PREFERRED EMBODIMENT

The plastic plate cover here shown as a typical example of an article capable of being manufactured according to the teachings of this invention comprises spaced, fused-together, outer and inner shells 10 and 12 respectively. Both of the shells 10 and 12 can be made of any suitable and conventional thermo-plastic material such as the polyolefins, for example, and particularly of polypropylene or polyethylene resin. The outer shell 10 of the particular article here shown has a bottom 14 and an annular side wall 16. The inner shell 12 is similarly formed with a generally circular bottom 18 and an annular side wall 20.

It is intended that the shells 10 and 12 be spaced substantially entirely apart and that the space between the shells be reduced to substantially below atmospheric pressure during manufacture of the cover for reasons set forth above. To this end, the side wall 16 of the outer shell 10 is made substantially deeper than the side wall 20 of the inner shell 12 and the side wall 20 preferably is offset inwardly from the side wall 16 so that the space between the two shells extends not only between the bottoms of the shells but also between the side walls thereof. Both of the shells 10 and 12 can be made by conventional injection molding methods. The peripheries of the shells 10 and 12 are suitably shaped to interfit with each other and, in a relatively large article such as the plate cover here shown, the bottoms of the shells preferably are formed with interfitting annular ribs or flanges 22 and 24 that support the bottoms and give additional strength and rigidity to the article. It is contemplated that the two shells 10 and 12 be fused together at the peripheries and at the flanges 22 and 24 by a conventional spin welding operation as disclosed in my copending application Ser. No. 793,301 filed Jan. 23, 1969. The cover is here shown upside down and the bottom of the cover 10 is formed at the outer side thereof with an annular flange or embossment on which a knob or other suitable form of handle can be mounted.

As suggested, any suitable or conventional spin welding apparatus can be used in the manufacture of plate covers or other articles of the type here shown; and the spin welder shown in the Decker et al. patent referred to above is suitable for this purpose. To this end, the disclosure of this patent is incorporated by reference herein. However, in order that this disclosure be complete, a brief description of the spin welder is now given.

Specifically, the welder here shown has a bottom platen 30 provided with a central, upwardly opening cavity 28 which is adapted to receive the outer shell 10 in the upside down position shown in the drawing; and the inner shell 12 is adapted to be press-fitted onto a mandrel 32 disposed directly above the cavity 28, as shown in FIG. 1. A liner 34 of a suitable elastic and resilient material is provided in the cavity 28 and a surface layer 36 preferably of similar elastic and resilient material is provided on the mandrel 32. Both the cavity 28 and the mandrel 32 are shaped to fit and snugly receive the outer and inner shells 10 and 12, respectively. Thus, the particular size and shape of the cavity 28 and of the mandrel 32 may well vary in any particular instance depending upon the article to be manufactured. The cavity 28 desirably is slightly smaller than the outer shell 10 so that the liner 34 is compressed and compacted when the shell is pushed into the cavity; and the surface layer 36 preferably is normally slightly oversize with respect to the inner shell 12 so that it is compressed and compacted also when the shell 12 is pushed thereon. It is necessary in this connection that the liner 34 and the layer 36 support the shells 10 and 12 over substantially the entire surface areas thereof and that they grip and hold the shells relatively tightly so that there is no tendency for the shells to slip or rotate relative to the supporting surfaces during the spin welding operation. Rubber, urethane and elastomeric vinyl are typical examples of materials suitable for the liner 34 and the layer 36; and materials of this type having a Durometer reading of between 60 and 70 are particularly suitable for this purpose.

The lower platen 30 is mounted on and fixed to the base 38 of the welder apparatus; and the mandrel 32 is fastened to the lower end of a vertical drive shaft 40. At its upper end, the drive shaft 40 is connected to the shaft 42 of an electric motor 44 which in turn is fastened to the piston rod 46 of a power cylinder 48 fixed to and depending from a suitable overhead support 50 of the welder. Fluid from any suitable source of pressure (not shown) is conducted to the upper end of the cylinder 48 through a pipe 52 and to the lower end of the cylinder through a pipe 54. Manifestly, energization of the motor 44 rotatably drives the shaft 40 and the platen 32. The two pipes 52 and 54 preferably are served by a suitable valve (not shown) according to conventional practice so that fluid under pressure can be directed either to the upper end or to the lower end of the cylinder 48. When fluid is supplied to the cylinder 48 through the pipe 52, the piston rod 46 is advanced to lower the motor 44 and the drive shaft 40 so as to bring the mandrel 32 into the cavity 28 and the shell 12 on the mandrel 32 into pressed interfitting engagement with the shell 10 disposed in the cavity 28. Contrariwise, supply of fluid under pressure to the cylinder 48 through the lower pipe 54 retracts the piston rod 46 and raises the motor 44 and drive shaft 40 to withdraw the mandrel 32 from the cavity 28.

In practice, the inner shell 12 is pressed onto the resilient covering layer 36 of the mandrel 32 when the latter is fully retracted and spaced from the lower platen 30; and the outer shell 10 is pressed into the resilient liner 34 of the cavity 28 when the mandrel 32 is retracted to permit ready access to the cavity. The piston rod 46 is then advanced in the manner hereinabove described to bring the two shells 10 and 12 together, and the motor 44 is energized to rotatably drive the upper platen 32. This causes the inner shell 12 on the mandrel 32 to rotate relative to the outer shell 10, and friction induced by rotation heats and softens the contacting surfaces of the shells so that they fuse together at the areas of contact after rotation is stopped and during a brief dwell period conventionally provided at that time. A period of rotation of only a few seconds usually is suitable for this purpose. Manifestly, the period of rotation and of the subsequent dwell period can be controlled quite accurately by a timer or other suitable and conventional means (not shown). After the two shells 10 and 12 have been fused together, the piston rod 46 is retracted to withdraw the mandrel 32, and the finished spin-welded product will either pull off of the platen or withdraw from the cavity depending upon which of the shells is the least tightly gripped. In any event, the finished article can be readily removed from the spin welder either manually or by suitable automatic means such as an air blast through the platen 30 or mandrel 32 and additional shells are then pressed onto the mandrel 32 and into the cavity 28 in the manner described preparatory to the next cycle of operation.

In order to suitably reduce the pressure between the two shells 10 and 12 prior to the spin welding operation and to maintain it during spin welding, the spin welder is equipped with a carrier plate 56 which is mounted directly above the lower platen 30 with the drive shaft 40 extending through a suitable opening 58 provided in the plate. Power cylinders 60 attached to and depending from a suitable overhead support 62 have piston rods 64 attached to the plate 56. Fluid under pressure from any suitable source (not shown) is supplied to the upper ends of the cylinders 60 through pipes 66 and to the lower ends of the cylinders through pipes 68. When fluid under pressure is supplied to the upper ends of the power cylinders 60 through pipes 66, the piston rods 64 are advanced to move the carrier plate 56 downwardly toward the platen 30; and when fluid under pressure is supplied to the lower ends of the cylinders through pipes 68, the piston rods 64 are retracted to move the carrier plate 56 upwardly away from the platen 30. As in the case of the power cylinder 48, the pipes 66 and 68 of each power cylinder 60 can be controlled by suitable valves (not shown) according to conventional practice, and the valving preferably is such that fluid is supplied in a like manner simultaneously to both cylinders 60 so that they operate in unison to advance or retract the carrier plate 56.

Suspended from the carrier plate 56 directly over the platen 30 is a suitable closure or vacuum head 70. The particular vacuum head 70 here shown has a generally circular header plate 72 and an annular or tubular wall 74 welded or otherwise fastened to and depending from the header plate. As shown in FIG. 1, the tubular closure wall 74 preferably is substantially the same size and shape as the platen 30 so that it fits on the latter when the carrier plate 56 is lowered to the position shown in the drawing. A suitable O-ring 76 mounted on and fastened either to the platen 30 or to the lower edge of the closure wall 74 seals the space between the platen 30 and the vacuum head 70 when the latter is lowered onto the platen. A flexible pipe 78 extends from the side wall 74 of the head 70 to a vacuum pump or the like (not shown) so that the closure and the cavity 28 can be evacuated when the closure is lowered onto the platen 30.

It will be observed that the closure 70 is suspended from the carrier plate 56 for vertical movement with the latter and for limited independent movement relative thereto by carrier rods 80 which are attached to and extend upwardly from the header plate 72. As shown, the rods 80 extend through opening 82 in the carrier plate 56, and compression springs 84 are provided between the header and the carrier plate around the rods. Nuts 86 on the upper ends of the carrier rods 80 and above the carrier plate 56 limit downward movement of the closure 70 but permit the latter to move toward the carrier plate against the action of the springs 84 when the closure 70 is dropped onto the platen 30 by the carrier plate. A stop 88 on the carrier plate 56 engages the header plate 72 to limit movement of the latter toward the carrier plate and consequential overstressing of the compression springs 84.

The drive shaft 40 also extends through a central opening 90 in the header plate 72, and the drive shaft is sealed at the opening by an O-ring 92 or the like. Also, the drive shaft 40 is provided directly above the header plate 72 with a radial flange 94 which limits downward movement of the drive shaft relative to the closure 70, and it is provided below the plate 72 with a radial shoulder 96 that limits upward movement of the drive shaft relative to the closure.

From the foregoing, it will be readily apparent that when the carrier plate 56 is retracted, the compression springs 84 expand to hold the closure 70 spaced below the carrier plate to the extent permitted by the nuts 86. However, when the carrier plate 56 is advanced to drop the closure 70 onto the lower platen 30, over-travel of the carrier plate is accommodated by the springs 84 within limits permitted by the stop 88. In practice, the carrier plate 56 normally is fully retracted at the beginning of the spin welding cycle of operation and the drive shaft 40 also is fully retracted with the shoulder 96 seated on the closure header plate 72. If desired, the power cylinder 48 and the shoulder 96 can be used to hold the closure 70 fully retracted with the compression springs collapsed as shown in the drawing. The carrier plate 56 is normally held fully retracted in order to provide maximum clearance between the lower platen 30 and the upper platen 32 and to facilitate removal of the finished article from between the platens at the end of each cycle of operation and subsequent application of individual shells 10 and 12 to the platens 30 and 32 preparatory to the next operating cycle. In any event, at the beginning of the operating cycle, the power cylinders 48 and 60 are advanced simultaneously and in unison. This action causes the closure 70 to seat on the lower platen 30 before the drive shaft 40 has advanced sufficiently to bring the inner shell 12 into nesting engagement with the outer shell 10. The vacuum pump which serves the pipe 78 normally operates continuously during the operating cycle of the machine; and, as soon as the closure 70 seats on the platen 30, all of the space within the closure including the cavity 28 and the space between the outer and inner shells 10 and 12 is evacuated. The extent to which the space is evacuated, of course, depends upon a number of contributory factors including the amount of suction produced by the vacuum pump and the speed or rate at which the power cylinder 48 is permitted to advance after the closure 70 seats on the platen 30. In any event, however, these conditions are worked out so that the space within the closure 70 is evacuated to the extent desired by the time the drive shaft 40 advances to place the inner shell 12 in the outer shell 10. After the shells 10 and 12 have been brought fully together, the motor 44 is energized for a brief period to rotatably drive the mandrel 32 and to rotate the inner shell 12 in and relative to the outer shell 10. The motor 44 is then deenergized to stop rotation of the mandrel and its associated part and the parts are held stationary and under pressure for a dwell period to perform the welding operation. After the welding step has been completed, the power cylinders 48 and 60 are retracted simultaneously in the manner described previously to complete the operating cycle of the machine.

As suggested, considerable difficulty has been experienced in spin welding articles of the type here under consideration with liquified plastic material or flashing being thrown off during the rotating step. This flashing, of course, occurs at the area of contact between the shells which become heated as a result of friction developed during rotation. Centrifugal force also developed during rotation of the parts causes the flashing to fly out and to accumulate on surfaces of the parts adjacent to the weld area. This overlay of flashing, of course, must be removed after the welding operation is completed; and this is a time consuming operation which results in a considerable increase in manufacturing cost.

According to the present invention, the interface between shells 10 and 12 at the periphery of the article is uniquely formed to confine and retain any flashing formed during spin welding and to do this in such a way that the flashing is prevented from being thrown onto an exposed surface of the article. More particularly, the two shells are formed with annular internal surfaces which interfit or seat against each other and are heated and fused together by spin welding. Adjacent to and outwardly of the seating surfaces, one of the parts is formed with a cavity in which flashing from the mating surfaces accumulates. Also, one of the parts is formed with a projecting radial lip which extends over and at least partially closes the cavity and thus serves to retain flashing in the cavity and to prevent it from flying out onto adjacent surfaces of the parts. Also, plastic material welling up from the cavity as the result of pressure against the parts during the dwell period and perhaps some incidental fusion due to contact of the lip with the opposite part during rotation of the inner shell 12 closes any gap that may exist between the lip and the opposite part so that in the finished article the two parts merge smoothly together without any significant crack or crevice between them in which food or dirt can accumulate.

In the case of the plate cover here shown by way of example, the outer shell 10 is formed at the inner side thereof and substantially below the rim 98 with an upstanding annular rib 100 and an annular upwardly opening groove 102 outwardly of and surrounding the rib 100. The inner shell 12 is formed at the outer side and adjacent the rim 104 thereof with a downwardly extending annular rib 106 and a downwardly opening annular groove 108 inwardly of the rib 106. As shown in FIG. 2, the two ribs 100 and 106 interfit when the shells are nested together, as shown in the drawing. In the interfitting relation of the parts, the upstanding rib 100 is received in the groove 108 and the depending rib 106 is received in the groove 102. It is desirable that the external annular peripheral surface 110 which extends from and is a continuation of the inner side of the groove 108 contact the confronting inner side of the rib 100 to properly center the parts 10 and 12 prior to and during the spin or rotating step. It is essential that the groove 102 be wider than the depending flange 106 to provide an annular cavity 112 of substantial proportions below and at the outer side of the rib 106. It also is a feature of the invention that the inner shell 12 is formed with a radially outwardly extending peripheral lip 114 which extends across and at least partially closes the cavity 112.

It will be readily apparent that when the rim portions of the two shells 10 and 12 are nested together, as shown in FIG. 2, the upstanding rib 100 seats solidly on the bottom of the groove 108 while the depending rib 106 is spaced from the bottom of the groove 102 and from the outer side 118 of the groove 102. Thus, during spin welding, the edge of the rib 100 and the bottom of the groove 108 comprises bearing surfaces that first become heated by friction. It is significant that the cavity 112 is immediately adjacent to and at the outer side of the bearing surfaces referred to above.

It will be recalled that the inner shell 12 is pressed downwardly against the outer shell 10 by the power cylinder 48 acting through the drive shaft 40 and the mandrel 32. This force together with friction induced by rotation of the inner shell 12 relative to the outer shell 10 causes the upstanding rib 100 to soften and flow as the spin welding step progresses. Further, as the rib 100 softens it begins to expand and to flow into the groove 108 and into the cavity 112. As this action progresses, the rib 100 wears away and the rib 106 settles into and begins to contact an increasingly large surface area of the groove 102. As the area of contact between the two ribs 100 and 106 and their respective grooves 108 and 102 increases, increasing amounts of flowing plastic material is produced which fills or at least begins to fill the adjacent cavity and to prepare the interfitting rib structure of the two shells 10 and 12 for joining together into a monolithic, one-piece mass as the fused plastic material cools during the dwell period. By the end of the spin welding operation, the cavity 112 at the outer side of the rib 100 is greatly reduced in size by plastic material and flashing that has flowed and been thrown from the bearing surfaces of the ribs 100 and 106 during spin welding. Also, the lip 114 has moved down toward and to some extent against the shoulder 116; and the definition of the lip has been modified and reduced by plastic material from the cavity 112 and incidental contact of the lip with the opposite part 10. This phenomenon with reference to the lip 114 causes the latter to merge smoothly with the outer shell 10 closing and sealing the cavity 112 and eliminating any sufficient crack or crevice between the inner and outer shells 12 and 10 at the rim 104.

It is essential that the cavity 112 be large enough to accommodate substantially all of the plastic material coming from the bearing surface of the interfitting ribs 100 and 106, and this of course, depends upon a number of variable factors such as the speed at which the inner shell 12 is rotated, the length of time it is rotated, the pressure imposed by the power cylinder 48, and the size of the interfitting injection molded parts which may vary somewhat in their physical dimensions.

At the end of the spin welding operation all of the bearing surfaces that have been softened and fused during rotation solidify and fuse together, as shown in FIG. 3, thus welding the two shells 10 and 12 together in an integral, one-piece, monolithic structure. It makes no difference that the outer cavity 112 is not entirely filled by the plastic material as it is completely hidden within the fused rims of the two shells 10 and 12 and covered over and sealed by the lip 114. The size of the cavity that remains after welding may vary somewhat depending upon the amount of softened plastic material coming from the bearing surfaces of the two shells during spin welding. This, however, is of no consequence. The important thing is that the cavity 112 accommodate and confine all of the softened material and flashing coming from the bearing surfaces so as to prevent it from being thrown outwardly onto the outer shell 10 at the inner side of the rim 98 or other exposed external surface of the article. The result is a clean article surface and a finished part that requires no significant amount of trimming or further processing after spin welding.

I claim:

1. A plastic article having separate shells spaced primarily apart and having annular localized areas fuse-welded together, the localized areas of said shells having tapered internal annular mating surfaces piloted on each other and fused together and an annular cavity outwardly thereof at least partially filled with flashing from said shells, one of said shells having an annular lip overlying said cavity and confining said flashing.

2. The method of joining annular portions of plastic parts comprising forming said parts with annular interfitting portions having mutually engaging mating, tapered, annular surfaces piloted one upon the other, providing a cavity between said parts adjacent to and outwardly of said surfaces, at least partially closing said cavity with a lip formed on one of said parts, and fusing said interfitting portions at said mutually engaging mating surfaces by a spin welding operation while simultaneously holding said parts aligned by means of said tapered surfaces and collecting flashing coming from said parts during said spin welding operation in the cavity and confining said flashing in said cavity by said lip.

3. Complimentary plastic parts adapted to be fused together in a single article by spin welding, said parts being provided with annular tapered portions adapted to interfit with and to engage each other at the inner sides thereof whereby each part is piloted on the other to hold the parts properly in alignment during spin welding, one of said parts being formed to provide a cavity adjacent to and outwardly of said interfitting portions for collecting flashing coming from said parts during spin welding.

4. The combination as set forth in claim 3 including an annular lip on one of said parts adapted to overlie said cavity, said lip adapted to confine said flashing to said cavity during spin welding.

5. The combination as set forth in claim 4 wherein said lip is formed integrally with said one part and extends radially outwardly therefrom over said cavity, said lip and the opposite part adapted to be at least partially fused together during spin welding to seal said cavity.

6. The article as defined in claim 1, wherein the other of said shells has an external annular surface adjacent to said cavity, and wherein said external surface is protected from flashing in said cavity by said annular lip.

7. The article as defined in claim 1, wherein said annular lip extends radially substantially entirely across said cavity to substantially close the same.

8. The article as defined in claim 1, wherein said annular lip extends substantially entirely across said cavity and is at least partially fused to the other of said shells.

9. The article as defined in claim 1, wherein the other of said shells has an annular external surface adjacent to said cavity, and wherein said annular lip extends radially substantially entirely across said cavity and is at least partially fused to said annular surface, whereby substantially to close the joint between said shells.

10. The method as defined in claim 2, wherein the lip is at least partially fused to the other of said parts during said spin welding operation, and wherein said lip and said other part are at least partially fused together at the same time as said mating surfaces, whereby substantially to close the joint between said lip and said other part.

11. The combination as set forth in claim 4, wherein said lip is formed integrally with said one part and extends radially outwardly thereof over and substantially entirely across said cavity.

References Cited

UNITED STATES PATENTS

| 3,002,870 | 10/1961 | Belgarde et al. | 156—73 |
| 3,120,570 | 2/1964 | Kennedy et al. | 156—73 |
| 3,244,574 | 4/1966 | Decker et al. | 156—382 |
| 3,411,977 | 11/1968 | Slater | 161—149 |

MORRIS SUSSMAN, Primary Examiner

U.S. Cl. X.R.

161—149; 156—73; 264—23